Figure 1:
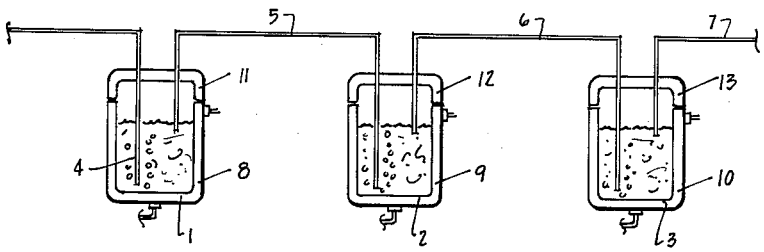

Sept. 18, 1962  T. C. HIGGINS  3,054,776
PRODUCTION OF HIGHLY POLYMERIC POLYMETHYLENE TEREPHTHALATES
Original Filed Jan. 17, 1958

*THOMAS CHARLES HIGGINS* INVENTOR

BY *Cushman, Darby and Cushman*
ATTORNEYS

United States Patent Office 3,054,776
Patented Sept. 18, 1962

3,054,776
PRODUCTION OF HIGHLY POLYMERIC POLY-
METHYLENE TEREPHTHALATES
Thomas Charles Higgins, Harrogate, England, assignor to
Imperial Chemical Industries Limited, London, Eng-
land, a corporation of Great Britain
Original application Jan. 17, 1958, Ser. No. 709,658. Di-
vided and this application Jan. 8, 1960, Ser. No. 7,592
Claims priority, application Great Britain Jan. 17, 1957
4 Claims. (Cl. 260—75)

This invention relates to a continuous process and an apparatus for the production of highly polymeric polymethylene terephthalates.

This application is a division of my copending application, Serial No. 709,658, filed January 17, 1958, and is entitled to the filing date thereof.

The fibre-forming highly polymeric polymethylene terephthalates may be prepared by ester-interchange between a dialkyl terephthalate and glycol and the polymerisable liquid product, bis-hydroxyalkyl terephthalate, mixed with low molecular weight polymer, is then subjected to polycondensation usually in the presence of a polycondensation catalyst. Although our invention is described in relation to using bis-hydroxyalkyl terephthalate alone, it can equally well be applied to polycondensation processes in which other polymerisable materials are present with the bis-hydroxyalkyl terephthalate, e.g. bis-hydroxyalkyl isophthalate. These polymerisable materials are hereinafter referred to collectively as bis-hydroxyalkyl terephthalate. Of the highly polymeric polymethylene terephthalates the best known is polyethylene terephthalate.

Polycondensation, to obtain high molecular weight highly polymeric polymethylene terephthalate, is usually carried out in mechanically stirred autoclaves using a batch polycondensation technique. It is desirable, however, to carry out this polycondensation reaction in a continuous process. The use of a number of stirred autoclaves in series to give a continuous process is cumbersome.

According to our invention we provide a process for the continuous polycondensation of a bis-hydroxyalkyl terephthalate by heating and agitating under reduced pressure while passsing the polymerisable liquid successively through a number of reaction zones in series, there being a pressure drop through the zones which causes the polymerisable liquid and the evolved vapours to flow through them, characterised in that polymerisable liquid and the evolved vapours from a previous zone or zones pass through substantially the whole depth of liquid in each following zone, thereby causing agitation of said liquid, before passing to successive zones through appropriately positioned outlets.

We also provide an apparatus for continuous polycondensation of bis-hydroxyalkyl terephthalate, comprising a number of closed heated chambers linked in series by heated ducts e.g. by heated connecting tubes, a feed inlet for the first chamber for supplying bis-hydroxyalkyl terephthalate and a final outlet from the last chamber for discharging polycondensed material, the inlet orifice for each chamber being near the bottom of the chamber and the outlet orifice being higher than the inlet, the inlet and outlet orifices being offset in relation to each other, the final outlet being linked to a collecting zone and a means being provided for causing a pressure drop from the feed inlet to the final outlet.

The positioning of the inlet and outlet orifices prevents the fluids escaping through the polymerisable liquid from passing directly from inlet orifice to outlet orifice. Thus there is a certain amount of time spent in each zone. This can be controlled by the depth of liquid and the pressure drop.

It will be appreciated that instead of the tubes other devices may be used for connecting the chambers in series, e.g. baffle plates positioned to form a duct, provided that the inlet orifice for each chamber is near the bottom of the chamber and the outlet orifice an appreciable distance from the bottom of the chamber to allow for a reasonable depth of liquid in each chamber. The actual distance between the inlet and outlet orifices for each zone will depend upon the conditions and the dimensions of the apparatus. It is preferred that this distance should be as large as is practicably possible.

We have found that only when the liquid from previous zones passes substantially through the whole depth of liquid in each zone, that the required conditions and agitation take place.

The reaction conditions for polycondensation, i.e. reduced pressure and high temperature, are such that a large volume of vapour is evolved, so that much splashing occurs. This splashing causes large surfaces of liquid to be formed. A large surface facilitates and speeds up the reaction and good agitation is obtained by the vapours as they must escape through substantially the whole depth of the liquid remaining in each zone. Agitation may be further promoted and controlled by bleeding an inert gas, such as nitrogen, through the zones. The inert gas may be bled-in at the feed end with the polymerisable liquid, or it may be introduced by a separate inlet in a subsequent zone, care being taken that a pressure drop through successive zones is maintained.

We have found that three reaction zones give good results but more zones can be used if desired. The zones may be arranged side by side but are preferably one below the other. The liquid in each zone is heated, for example by heating fluids in a housing jacket. Other methods of heating such as heating tubes or immersion heaters can also be used.

The vapours given off during polycondensation consist to the greatest part of the corresponding alkylene glycol, i.e. ethylene glycol when producing polyethylene terephthalate, using bis-2-hydroxyethyl terephthalate.

It will be appreciated that the liquid should only be heated for a sufficient time and temperature to obtain a degree of polycondensation which permits the free flow of the liquid and the escape of vapours through the liquid. We have found that liquids of an intrinsic viscosity of between 0.1 and 0.5 can be handled without difficulty but preferably the intrinsic viscosity should not exceed 0.4. If it is desired to obtain polymers of higher viscosity it is necessary to continue the polycondensation in a separate step. A suitable process and an apparatus for carrying out this step in a continuous process is described in our copending British application 38704/56.

Intrinsic viscosity as used in this specification, denotes the degree of polymerisation of the bis-hydroxyalkyl terephthalate determined in a very dilute solution in ortho-chlorphenol. The intrinsic viscosity is determined as follows:

A 0.25 g. sample is accurately weighed and dissolved in 25 ml. of orthochlorphenol, having a boiling point of 175–176° C. by heating at 100° C. for 15–30 minutes. After cooling the flow time of the solution in an Astwald Viscometer No. 2 B.S.S. is determined at a temperature of 25° C.±0.1° C. The concentration (C) of the solution is expressed in grams dissolved in 100 ml. at 25° C. The specific viscosity (SV) is the ratio:

$$\frac{\text{flow time of solution}}{\text{flow time of solvent}} - 1$$

from this, the intrinsic viscosity (IV) is calculated:

$$IV = \left[\frac{(SV)}{C}\right]_{C \to 0}$$

The subatmospheric pressure used should be as low as possible, for commercial operation, preferably below 1 mm. of mercury, in the last zone.

In the case of polyethylene terephthalate temperatures of 240–290° C., preferably between 250 and 285° C. are suitable.

The following examples and drawings, accompanying the provisional specification, illustrate but do not limit our invention.

In the drawing FIG. 1 is a diagrammatic section of the apparatus with three reaction zones side by side, in series.

Figure 2:
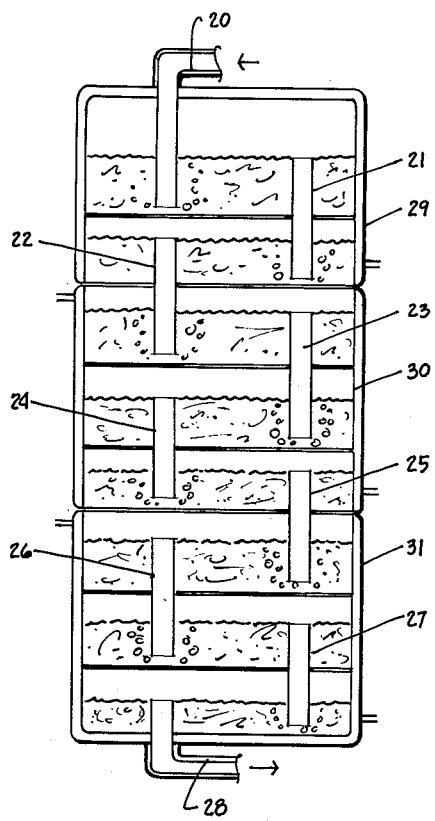

FIG. 2 is a diagrammatic side section of a polymerisation tower with eight reaction zones in series and arranged one below the other.

Referring to the drawing FIG. 1 shows three identical autoclaves 1, 2 and 3, side by side in which the reaction zones, which are connected in series, are formed.

The autoclaves are fitted with one inlet and one outlet each, in the form of tubes 4, 5, 6 and 7, which connect the autoclaves in series, and also with the feed 4 and outlet 7 for the polymerisable liquid.

One end of the tubes 5 and 6 constitutes the inlets and terminates near the bottom of the autoclaves 2 and 3. The other end of the tubes 5 and 6 constitutes the outlet and terminates an appreciable distance from the bottom of the autoclaves 1 and 2, and determines the level of the liquid in the autoclaves. The outlet tube 7 determines the liquid level in autoclave 3, which is substantially the same as in autoclaves 1 and 2.

External heating jackets 8, 9 and 10 for the autoclaves as well as for the lids 11, 12 and 13 are provided which can be circulated with heating fluids through suitably positioned connections.

In operation polymerisable liquid is fed through the inlet tube 4 and a vacuum is applied at the outlet tube 7. The vacuum causes a pressure gradient through the autoclaves. The autoclaves are heated up by circulating a heated fluid through the heating jackets. The feed of the polymerisable liquid is adjusted so that the reaction time in each autoclave is sufficient to yield a polymer of sufficiently low viscosity to give the free flow at the reaction temperature used in the apparatus. Agitation is obtained when the reduced pressure is applied to the outlet pipe in the third autoclave, as the liquid and vapours evolved from the liquid escape through substantially the whole depth of liquid in successive autoclaves.

Referring to FIG. 2 this shows a diagrammatic section through a reaction tower comprising interconnected compartments which form eight reaction zones in series. The compartments are connected with tubes 21, 22, 23, 24, 25, 26 and 27. The first compartment at the top has a feed inlet 20 for the polymerisable liquid. The feed inlet and the tubes have bottom orifices terminating near the floor of each compartment. The tubes are offset in relation to one another and their top orifices form the outlets for the liquids and vapours between the compartments and are positioned an appreciable distance above the floor of each compartment thereby determining the depth of liquid in each compartment which forms the reaction zones. By applying a reduced pressure to the outlet pipe 28 and by adjusting the feed at the pipe 20 the total hold up time in the eight compartments can be regulated. The compartments are externally heated by three separate heating jackets 29, 30 and 31 by means of heating fluids.

*Example 1*

A product of ester-interchange of dimethyl terephthalate and glycol comprising bis-2-hydroxyethyl terephthalate and a very low molecular weight polymer of polyethylene terephthalate having an intrinsic viscosity of less than 0.08 is fed into the polycondensation apparatus as shown in FIG. 2 but having only three compartments forming the reaction zones, one above the other. Vacuum is applied at the bottom of the last zone, the apparatus is heated and evolved ethylene glycol is withdrawn at the bottom together with polymer using a temperature of between 250 and 280° C. The temperature in the first compartment is kept at 250° C. whilst the pressure is 100 mm. mercury. The temperature in the second compartment is 280° C. and the temperature in the third compartment is 280° C. whilst the pressure is 60 mm. mercury. The throughput rate is 1 lb. per hour. The total hold up time in the three compartments is 1½ hours. The intrinsic viscosity of the resultant product is 0.18.

*Example 2*

The polycondensation reaction described in Example 1 and using the same apparatus is repeated with a change of the throughput rate, the pressure applied and by increasing the hold up time as follows:

The temperature in all the zones including the first zone is 280° C. whilst the pressure in the first zone is 77 mm. of mercury and in the third zone only 50 mm. of mercury. The throughput rate is reduced to 1 lb. per hour and the total hold up time in all three zones is 3 hours. The intrinsic viscosity of the resultant product is 0.36.

*Example 3*

A liquid containing bis(2-hydroxyethyl)terephthalate and a low molecular weight polymer of polyethylene terephthalate having an intrinsic viscosity of 0.08 and containing calcium acetate and antimony oxide as catalysts, is fed continuously into a polycondensation apparatus having five compartments arranged as shown diagrammatically in FIG. 2, one below the other.

The vertical circular cylindrical vessel in this case has an internal diameter of 7.6 cm. and each compartment is 15.2 cm. from top to bottom. The pipes corresponding to the feed inlet 20 and pipes 21, 22, 23, 24 and 25 which forms the outlet as pipe 28, are of 5 mm. bore, the inlet pipe 20 and other pipes 21, 22, 23 and 24 terminate 1.2 cm. from the bottom and pipes 21, 22, 23, 24 and 25 project with their other end 12 cm. from the bottom of each compartment. The pipes 20, 22 and 24 are off-set a distance of 3.5 cm. from pipes 21, 23 and 25 respectively.

There is a vertical distance of 10 cm. between the inlets and outlets of the offset pipes. A heating jacket 29 and 30 surrounding the cylindrical vessel maintains a temperature of 283° C. inside the vessel. The inlet pipe 20 and outlet pipe 25 (corresponding to pipe 28) are also jacketed. A vacuum pump connected to the outlet reduces the pressure from about 40 mm. in the first compartment to 4 mm. in the last compartment. The feed is adjusted so that a residence time of 2½ hours in the five zones is obtained. The intrinsic viscosity of the issuing liquid is 0.31.

Using the apparatus of our invention the liquid after polycondensation in each zone is taken to the bottom of the next zone and thereafter has to escape through substantially the whole depth of the layer of liquid in each zone, thereby good mixing is obtained. Similarly the escaping vapours evolved during the polycondensation reaction are taken to the bottom of each successive zone thereby causing agitation of the liquid in each zone. If frothing occurs this does not cause blockages but helps to provide an enlarged reaction surface and excess froth merely flows to the next reaction zone. Frothing usually occurs when too low a pressure is applied at the beginning of the reaction. The too low pressure also causes vaporisation and sublimation which in the conventional apparatus gives rise to trouble in the condenser system. In our apparatus the froth, sublimate and vapours, escaping to successive zones, are being scrubbed and it is therefore possible to apply a reduced pressure even at the beginning of the reaction, without harmful effects. Consequently the temperature at which polycondensation can be started can be higher than with the conventional batch polymerisation apparatus and thereby the reaction time can be reduced. A temperature gradient can be applied by suitable jacketing in successive zones.

As the inlet tubes reach nearly to the bottom of each compartment or zone, the majority of the liquid can be removed for cleaning of the apparatus, by reversing the suction and by applying suction to the feed inlet pipe.

Using our apparatus we obtain good mixing, a homogeneous distribution of the polycondensation liquid in all zones, without the use of mechanical stirrers. Furthermore, we obtain the advantage of operation with a continuous process and the production of polycondensates showing remarkably little degradation which is essential in the manufacture of clear and colourless fibre and film-forming polymers.

What I claim is:

1. A process for the continuous polycondensation of bis-hydroxyalkyl terephthalate comprising heating and agitating said terephthalate in liquid form under sub-atmospheric pressure in a series of reaction zones each of which contains a pool of said reacting liquid terephthalate and polyalkylene terephthalate, passing said terephthalate and any vapors evolved during polymerization through said zones in sequence by introducing said terephthalate and said vapors into each zone through an inlet below the level of the liquid and near the bottom of the pool of liquid in said zone, withdrawing them from each zone at a point substantially at the top of the liquid in said zone, thereby passing them substantially through the whole depth of the liquid in said zone and then transferring the terephthalate and vapors thus withdrawn from each zone to the next zone for introduction below the level of the liquid and near the bottom of said next zone and maintaining said zones at reduced pressure and successively lower pressures along the path of flow of said terephthalate, the pressure differential between successive zones being sufficient so that the pressure differential draws the liquid from each zone to the next and interrupting the polymerization before the intrinsic viscosity of said liquid exceeds 0.5.

2. A process for the continuous polycondensation of bis-hydroxyalkyl terephthalate as set forth in claim 1 wherein agitation is further promoted and controlled by bleeding an inert gas through the zones.

3. A process for the continuous polycondensation of bis-hydroxyalkyl terephthalate as set forth in claim 1 in which the bis-hydroxyalkyl terephthalate is bis(2-hydroxyethyl) terephthalate.

4. A process for the continuous polycondensation of bis-hydroxyalkyl terephthalate as set forth in claim 3 in which the temperature of said reacting terephthalate is between 250 and 285° C.

References Cited in the file of this patent

UNITED STATES PATENTS 2,727,882 Vodonik _____ Dec. 20, 1955